United States Patent Office 3,311,816
Patented Mar. 28, 1967

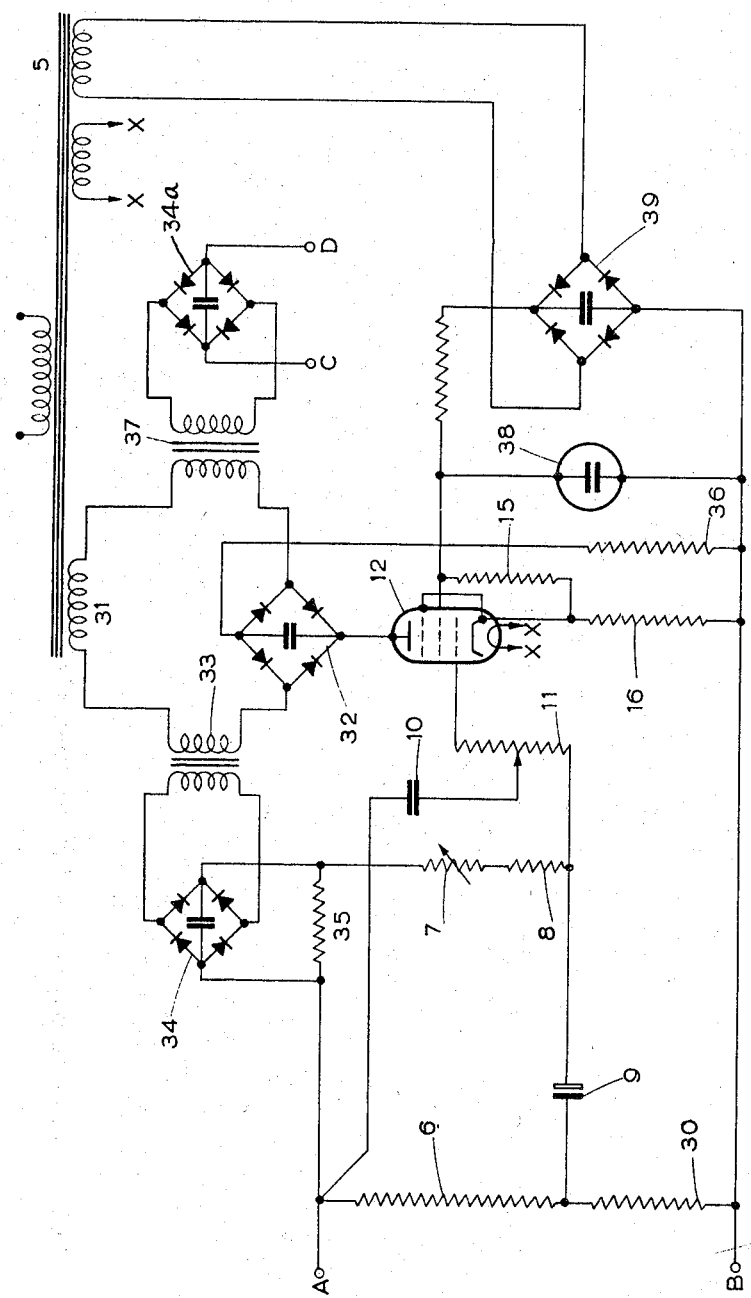

3,311,816
ELECTRONIC VOLTAGE CONTROLLER
Fritz Ludwig Felix Steghart, 11 Morelands Drive,
Gerrards Cross, England
Continuation of application Ser. No. 206,535, June 12, 1962, which is a division of application Ser. No. 692,845, Oct. 28, 1957. This application May 20, 1966, Ser. No. 551,808
Claims priority, application Great Britain, Nov. 1, 1956, 33,350/56; Dec. 28, 1956, 39,377/56
5 Claims. (Cl. 323—22)

This application is a continuation of my copending application Ser. No. 206,535, now abandoned, filed on June 12, 1962, which in turn was a division of my application Ser. No. 692,845, filed on Oct. 28, 1957, now abandoned.

The controller of the present invention comprises a controlling circuit having an input for receiving a direct current error signal and an output for energizing a controlling device. The error signal is derived from a measurement signal and the magnitude of the error signal is a measure of the deviation of a physical property, such as a temperature, from a predetermined desired value. The output circuit energizes the controlling device to restore the physical property to the desired value at which the error signal is zero.

The error signal is ordinarily derived from a sensitive transducer and the controlling device requires a substantial energy input. For this reason, the controlling circuit includes a power amplifier. There is, however, some risk that, when a sensitive transducer, such as a thermocouple, is used to provide the measurement signal, earth or ground leakage currents may flow from the high potential portion of the amplifier to the transducer and cause substantial errors.

The object of the invention is to provide an improved controlling circuit in which the effect of ground leakage currents is reduced by the provision of low leakage insulation between the input and output portions of the controlling circuit.

According to the invention there is provided a controlling circuit comprising: an input circuit arranged to receive a direct current error signal: an electron flow amplifier device having a direct current output circuit for energizing the means for controlling a condition to be regulated, any deviation of said condition from a desired value producing a change in the polarity and magnitude of the error signal which, in turn, produces energisation of said controlling means tending to restore said condition to said desired value in accordance with the sum of a continuous proportional component and a continuous time integral component of the error signal, and an insulating transformer device having two fixed windings magnetically coupled together and highly insulated from each other electrically, the windings, in operation, receiving a signal from the input circuit and supplying a signal to the output circuit respectively and the input and output circuits being sufficiently highly insulated from each other as to effectively eliminate leakage currents.

A preferred embodiment of the invention will now be described, by way of example, with reference to the accompanying drawing, wherein the single figure is an electrical circuit diagram of a controller embodying the invention.

Referring to the drawing, a direct current error signal is applied to input terminals A and B. The magnitude of the error signal varies in accordance with a physical condition, such as a temperature, to be controlled. A unidirectional output signal is produced at output terminals C and D and is applied to controlling apparatus (not shown) which will, in the case of temperature control, regulate the flow of a heating or cooling medium, in response to the output signal, to restore the controlled temperature which is causing the error signal to be restored to its correct value for which the error signal is zero.

The error signal is applied to the resistors 6 and 30 in series, the junction between these resistors being connected to the control grid of pentode amplifier tube 12 via the electrolytic integrating capacitor 9 and the potential divider 11 in series. The screen and cathode of the pentode 12 are supplied with direct potentials from the rectifier 39, the screen potential being stabilized by means of a voltage regulator tube 38. Resistors 15 and 16 are connected in series between the screen of pentode 12 and the negative terminal of rectifier 39 and their junction is connected to the cathode of pentode 12 to provide a stabilized grid bias.

The lower end of resistor 30 is connected to the negative terminal of rectifier 39. The error signal which is received at input terminals A and B is applied to a voltage divider consisting of serially connected resistors 6 and 30. The proportional component of the error signal which is developed across resistor 30 is applied to the control grid of pentode 12 via the integrating capacitor 9 and adjustable potentiometer 11. The potential of the control grid of pentode 12 therefore includes a component which changes instantaneously in proportion to the error signal.

During the interval of time following the appearance of the error signal, the integrating capacitor 9 is charged continuously via variable resistor 7 and fixed resistor 8 in series. A further potential, added to the proportional potential across resistor 8, is therefore applied to the grid of pentode 12 approximately representative of the time integral of the error signal.

When the error signal changes a charging current for differentiating capacitor 10, approximately proportional to the derivative or time rate of change of the error signal, flows through the lower part of potentiometer 11, integrating capacitor 9 and resistor 30. Under transient conditions integrating capacitor 9 can be regarded as short circuited and the effect of this charging current in differentiating capacitor 10 is to apply a third additional potential to the grid of pentode 12 approximately representative of the time derivative of the error signal.

The pentode 12 is supplied with anode current by the direct current terminals of a bridge rectifier network 32. The alternating terminals of rectifier 32 are energized from secondary winding 31 of a power supply transformer 5 in series with the primary windings of high insulation resistance transformers 33 and 37. The anode-cathode circuit of the pentode 12 is connected in series with cathode resistor 16 and anode load resistor 36 across the output of rectifier 32.

The secondary winding of transformer 33 supplies the input of rectifier 34, the output of which is connected across feedback resistor 35. A feedback potential is, therefore, developed across resistor 35 which is proportional to the anode current flowing in the pentode 12 and the connections are such that the effect of this feedback potential is to ensure that the time integral potential across the integrating capacitor 9 varies approximately linearly with time when the error signal remains constant.

The secondary winding of transformer 37 is connected to the input of a rectifier 34a the output of which is connected to controlling means (not shown) via the output terminals C and D. The transformer 37 thus serves to isolate electrically the terminals A and B from the output terminals C and D.

In operation, the error signal from the input circuit A, B, 6, 30 travels through a forward energy path defined by the integrating circuit 7, 8, 9, the differentiating circuit 10, 11, the pentode 12 and the bridge rectifier 32 to the output circuit 37, 34a, C, D. A feedback path defined by transformer 33, rectifier 34 and feedback resistor 35 operates to maintain linear charging current in the integrating capacitor 9 instead of the usual exponentially decreasing current. The output signal available at terminals C, D is at an energy level sufficient for the operation of controlling apparatus for restoring the controlled condition to its desired value for which the error signal is zero.

What is claimed is:

1. A process controller comprising:
   input terminals for receiving a direct current signal dependent upon a physical condition which is to be controlled according to a predetermined desired value thereof;
   output terminals for connection to controlling means for restoring said physical condition to said desired value in response to said direct current signal;
   amplifier means, including means for converting direct current into alternating current, having an input connected to one of the said input terminals, to combined integrating and differentiating means (9 and 10) and having an output connected to one of said output terminals;
   said combined integrating and differentiating means comprising a resistance-capacitance network for causing a time integrated and a time differentiated component of said signal to appear at said output of said amplifier means, said combined integrating and differentiating means being connected to receive an amplified signal from said amplifier output and apply said time integrated and time differentiated component to said amplifier input; and
   isolation means comprising a transformer of high insulation resistance isolating said combined integrating and differentiating means in one pole from said amplifier output.

2. A controller according to claim 1, comprising a transformer of high insulation resistance isolating the input of said amplifier means from one of said output terminals.

3. A process controller comprising:
   input terminals for receiving a direct current signal dependent upon a physical condition which is to be controlled according to a predetermined value thereof;
   output terminals for connection to controlling means for restoring said physical condition to said desired value in response to said direct current signal;
   amplifier means, including means for converting a direct current into alternating current, having an input connected to one of said input terminals, and to integrating means (9) and having an output connected to one of said output terminals;
   said integrating means comprising a resistance-capacitance network for causing a time-integrated component of said signal to appear at said output of said amplifier means, said integrating means being connected to receive an amplified signal from said amplifier output and apply said time integrated component to said amplifier input; and
   isolation means comprising a transformer of high insulation resistance isolating said integrating means in one pole from said amplifier output.

4. A controller according to claim 3, comprising a transformer of high insulation resistance isolating the input of said amplifier means from one of said output terminals.

5. A process controller comprising:
   input terminals for receiving a direct current signal dependent upon a physical condition which is to be controlled according to a predetermined value thereof;
   output terminals for connection to controlling means for restoring said physical condition to said desired value in response to said direct current signal;
   amplifier means, including means for converting a direct current into alternating current, having an input connected to one of said input terminals, and to differentiating means (10) and having an output connected to one of said output terminals;
   said differentiating means comprising: a resistance-capacitance network for causing a time differentiated component of said signal to appear at said output of said amplifier means, said differentiating means being connected to receive an amplified signal from said amplifier output and apply said time differentiated component to said amplifier input; and
   isolation means comprising a transformer of high insulation resistance isolating the said differentiating means in one pole from said amplifier output.

References Cited by the Examiner
UNITED STATES PATENTS 2,668,264  2/1954  Williams _____ 318—28
2,974,237  3/1961  Ehret _____ 307—88.5

JOHN F. COUCH, *Primary Examiner.*

LLOYD McCOLLUM, *Examiner.*

D. L. RAE, W. E. RAY, *Assistant Examiners.*